US006700480B2

(12) United States Patent  (10) Patent No.: US 6,700,480 B2
Moore  (45) Date of Patent: Mar. 2, 2004

(54) ADDRESSABLE VEHICLE MONITORING SYSTEM AND METHOD

(75) Inventor: Ronald G. Moore, Troy, MI (US)

(73) Assignee: Robert Bosch Corporation, Broadview, IL (US)

( * ) Notice: Subject to any disclaimer, the term of this patent is extended or adjusted under 35 U.S.C. 154(b) by 37 days.

(21) Appl. No.: 10/134,110

(22) Filed: Apr. 29, 2002

(65) Prior Publication Data

US 2003/0201882 A1 Oct. 30, 2003

(51) Int. Cl.[7] .............................................. B60C 23/00
(52) U.S. Cl. .................. 340/445; 340/3.5; 340/825.21; 439/34
(58) Field of Search ........................ 340/445, 3.5, 3.55, 340/825.21, 502, 504, 505, 506, 3.7, 825.52, 825.57; 439/34, 502, 660; 701/36; 307/9.1, 10.1–10.6, 99, 153

(56) References Cited

U.S. PATENT DOCUMENTS

| 4,179,740 | A | * | 12/1979 | Malin | 364/442 |
|---|---|---|---|---|---|
| 5,146,215 | A | * | 9/1992 | Dorori | 340/825.32 |
| 5,321,312 | A | * | 6/1994 | Willy | 307/125 |
| 5,353,009 | A | * | 10/1994 | Marsh et al. | 340/505 |
| 5,376,757 | A | * | 12/1994 | Marsh et al. | 174/72 A |
| 5,512,890 | A | * | 4/1996 | Everson, Jr. et al. | 340/870.13 |
| 5,664,221 | A | * | 9/1997 | Amberg et al. | 395/829 |
| 5,719,551 | A | * | 2/1998 | Flick | 340/426 |
| 5,722,646 | A | * | 3/1998 | Soderberg et al. | 269/20 |
| 5,790,016 | A | | 8/1998 | Konchin et al. | 340/448 |
| 5,880,363 | A | | 3/1999 | Meyer et al. | 73/146.5 |
| 6,498,967 | B1 | * | 12/2002 | Hopkins et al. | 701/1 |
| 6,518,876 | B1 | * | 2/2003 | Marguet et al. | 340/447 |

* cited by examiner

Primary Examiner—Benjamin C. Lee
Assistant Examiner—Phung Nguyen
(74) Attorney, Agent, or Firm—Michael Best & Friedrich LLP

(57) ABSTRACT

An addressable monitoring system and method for addressing sensors. In one embodiment, the invention provides an addressable monitoring system for a vehicle. In one embodiment, the system includes a plurality of sensors each having at least one address input; a harness; and a controller. The harness includes a common bus coupled to each of the plurality of the sensors. Each sensor is operable to determine its own address according between the sensor and the harness. The controller sends a signal having address information and control or command information through the harness. The sensor having an address that corresponds to the address information in the signal sent by the controller responds. The system is applicable to a tire pressure monitoring system having multiple sensors, one sensor located on or in each tire. Each sensor may be paired with an addressable initiator located in the proximity of the tire.

23 Claims, 4 Drawing Sheets

| A | B | ADDRESS |
|---|---|---|
| GRD | GRD | TIRE 1 |
| GRD | N | TIRE 2 |
| N | GRD | TIRE 3 |
| N | N | TIRE 4 |

N = NO CONNECTION
GRD = GROUND

ADDRESSABLE VEHICLE MONITORING SYSTEM AND METHOD

BACKGROUND OF THE INVENTION

The present invention relates to vehicle monitoring systems. More particularly, the invention relates to an addressable monitoring system for a vehicle.

Old systems and methods used to check or monitor vehicle parameters, such as tire pressure, generally require manual inspections at regular intervals with mechanical gauges. Manual inspections are usually inconvenient and possibly unreliable tasks. In addition, such inspections do not provide information on demand while a vehicle is moving. For these reasons, automated monitoring systems have been developed.

Automated vehicle monitoring systems can enhance the performance and safety of a motor vehicle. For example, a tire pressure monitoring system can be used to alert an operator of an incorrectly inflated tire. An incorrectly inflated tire can undergo uneven wear, lower vehicle fuel efficiency, and compromise safe handling of the vehicle.

One known vehicle monitoring system includes an air pressure sensor and transmitter/receiver mounted on or inside each tire (the sensor and transmitter/receiver are sometimes collectively and generically referred to as a "sensor"). The transmitter/receivers may be programmed or otherwise configured to periodically send information via radio waves (RF) to a central receiver. The central receiver may be coupled to a display or other device that provides human-readable output. When information is desired at a non-periodic interval or time, the transmitter/receivers may be activated (i.e., caused to read or obtain information from the sensor and then transmit that information to the central receiver) by using separate transmitters (often referred to as "initiators" or "sensor initiators") that are mounted in close proximity to each transmitter/receiver. The initiator generates a low frequency modulated magnetic field of sufficient intensity to wake up the tire sensor. Each initiator is separately wired to a control unit (which may or may not be the central receiver). The system may require each initiator to have a unique pre-programmed or otherwise pre-configured identity such that information may be obtained from a specific tire.

BRIEF DESCRIPTION OF THE INVENTION

While functional, existing tire pressure monitoring systems are not completely satisfactory. One problem with existing systems is that since each initiator in a multiplexed system has a unique identity, initiators are not easily interchangeable. Thus, when an initiator fails, then a specific, identical initiator rather than a generic replacement initiator must be installed in its place or the system must have the capability to "learn" the identity of the new initiator.

Herein, the term "sensor" is used broadly. An individual "sensor" may include or otherwise be associated with an activator or initiator as well as a transmitter and/or a receiver. In some embodiments, the initiator rather than the sensor itself may have an address input and be connected to the harness.

Accordingly, in one embodiment, the invention provides an addressable monitoring system for a vehicle. The system may be used to monitor tire pressure but may also be used in other monitoring applications. The system includes a plurality of sensors each having at least one address input, a harness and a controller. The harness includes a single bus line coupled to each of the plurality of sensors. Each sensor is operable to determine its own address according to the connection made between the harness and the sensor. When data from a particular sensor is desired (which might be determined based on input from a person in the vehicle), a controller sends a signal having address information and control information through the harness to each of the plurality of sensors. The address information is associated or correlated to the sensor of interest. Although all the sensors may receive the signal from the controller, only the sensor having the address that corresponds to the address information in the signal responds to the control information in the signal.

In another embodiment, the invention provides a method of addressing sensors in a vehicle. The method includes locating the sensors on a vehicle, connecting each sensor to a harness having a bus line and address connectors, and connecting the harness to a controller. The controller sends command signals with an address or address information through the harness to each of the plurality of sensors. Each sensor determines its own address according to the connection of the harness to at least one address input of the sensor. Thus, each sensor recognizes the command signals addressed to itself and ignores signals addressed to or intended for other sensors.

In yet another embodiment, the invention provides an addressable vehicle tire pressure monitoring system. The system includes a controller, a wiring harness, initiators, transmitters, and measurement devices at each tire. The common wiring harness includes a communication bus and address connectors. The controller sends address signals and control data through the common wiring harness to initiators located at each tire. Each initiator has inputs for two address connectors, a power line, a ground line, and a communication bus line. Each initiator determines its own address based upon the address connectors of the harness, such that each initiator is capable of recognizing a command signal addressed to itself. Upon receiving a command signal, the initiator activates a transmitter to transmit an air pressure reading from the tire to a controller (which may or may not be the controller that generates command signals for the initiators). The controller receives the transmitted signal, translates the information, and matches the address to a tire location. Because identity and address information is determined based upon its wire harness connection, each initiator can be identical with no requirement of preprogramming an identity into the initiator.

As is apparent from the above, it is an aspect of the invention to provide a method and system of identifying and addressing sensors in a vehicular monitoring system. Other features and aspects of the invention will become apparent by consideration of the detailed description and accompanying drawings.

DETAILED DESCRIPTION

Figure 1:
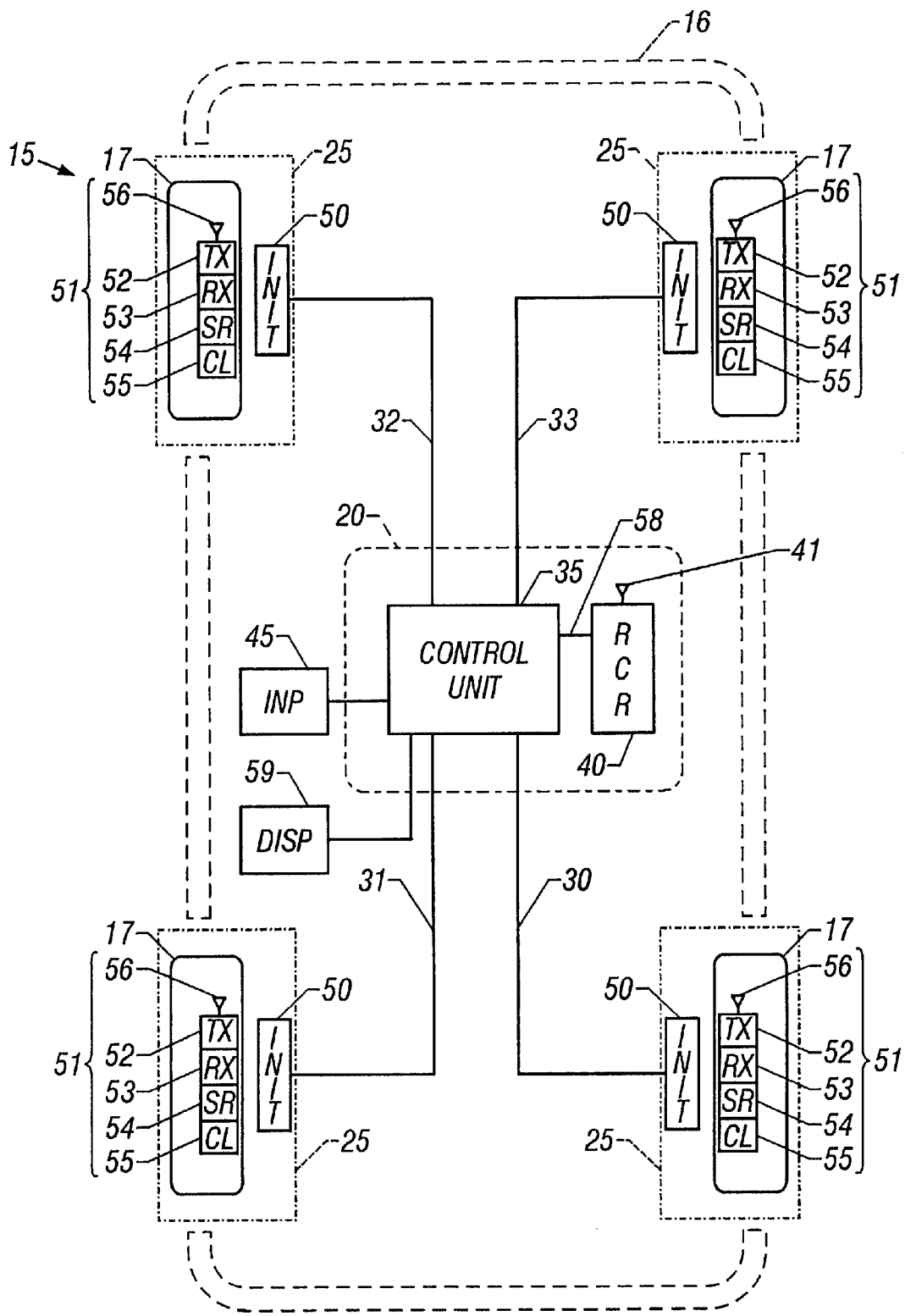
FIG. 1 is a schematic illustration of a known tire pressure monitoring system.

Before any embodiments of the invention are explained in detail, it is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. The terms "connected," "coupled," and "mounted" are used broadly and encompass both direct and indirect connection, coupling, and mounting. In addition, the terms "connected" and "coupled" are not restricted to physical or mechanical connections or couplings.

A known tire pressure monitoring system 15 for a vehicle 16 is shown in FIG. 1. The vehicle 16 has four tires 17. The system 15 includes a controller 20 and four sensors 25. Each sensor 25 is connected to the controller 20 by separate links shown by wires 30, 31, 32, and 33. The controller 20 includes a control unit 35 and a reception device or receiver 40. The receiver 40 is connected to an antenna 41. The control unit 35 may incorporate a microprocessor, microcontroller, or other device capable of executing instructions. Preferably, the control unit 35 is programmable and able to process inputs and generate outputs. The control unit 35 is connected to an input device 45. The input device 45 may actually be a number of devices and may take the form of one or more buttons, switches, keyboards, cursor devices, joysticks, touch screens, voice recognition systems, etc. A typical location for the input device 45 is the vehicle dashboard (not shown) although other locations are possible.

Each sensor 25 includes an initiator 50 (sometimes referred to as a "long wave unit" because in many instances common initiators include components that transmit signals at low frequencies—for example, 125 KHz). In the system 15 shown, each sensor 25 also includes a wheel module 51. The wheel module 51 may include a transmitter 52, a receiver 53, a sensor 54, a controller 55 and an antenna 56. A single initiator 50 is located in relatively close proximity and assigned to a single wheel module 51. The wires 30–33 individually link each initiator 50 to the control unit 35. The wheel modules 51 may be programmed to periodically transmit a pressure signal, preferably at relatively close and sequential, but nonetheless distinct times so as to avoid interference that often occurs when multiple signals are transmitted simultaneously. The pressure signals are received by the receiver 40 through the antenna 41. The receiver 40 may, as shown, deliver received signals to the control unit 35 for processing through a link 58. Alternatively, the receiver 40 may deliver received signals to a separate controller such as a controller that controls remote keyless entry and other wireless vehicle systems (not shown). Signals received by the control unit 35 or other controller may be processed to create visible output on a display (such as an output device discussed below).

Pressure readings may also be obtained in response to user or driver input. As noted above, the input device 45 may have various keys, etc. associated with each tire 17. To obtain a pressure reading from a tire 17, the control unit 35 selectively feeds a long wave signal over the appropriate bus line 30–33 to the designated initiator 50. The signal activates the desired initiator 50. Upon activation, the initiator 50 transmits a long wave signal to its assigned wheel module 51. The relevant wheel module 51, in turn, reads its sensor 54 and sends a signal containing the pressure information to the receiver 40.

Each wheel module 51 is located on or in each tire 17 of the vehicle 16. As noted, in the embodiment shown, each wheel module 51 includes a transmitter 52, a receiver 53, a sensor or measurement device 54, a controller or processor 55, and an antenna 56. The receiver 53 receives the signal transmitted from the initiator 50. Reception of the long wave signal causes the transmitter 51 to transmit information obtained by the sensor 54 (in the embodiment shown, the information is air pressure information for the tire). The control unit 55 of the wheel module 51 also causes the transmitter 52 to transmit information that identifies the tire 17 associated with the sensor 54 information. In one embodiment, the control unit 55 of the wheel module 51 processes the air pressure reading or information and the tire identification information into a single data signal. The transmitter 52 of the wheel module 51 sends the data signal to the controller 20. The receiver 40 at the controller 20 receives the data signal and may transfer the data signal or a conditioned version thereof to the control unit 35 or, alternatively, to a separate processor or control unit (not shown). The control unit 35 processes the data signal such that information regarding the pressure in a particular tire 17 may be relayed to a driver or vehicle passenger through a display or similar output device 59 or used by vehicle control systems (e.g., antilock braking, active suspension, etc., not shown). Like the input device 45, the output device 59 may be located in the vehicle dashboard (not shown).

Figure 2:
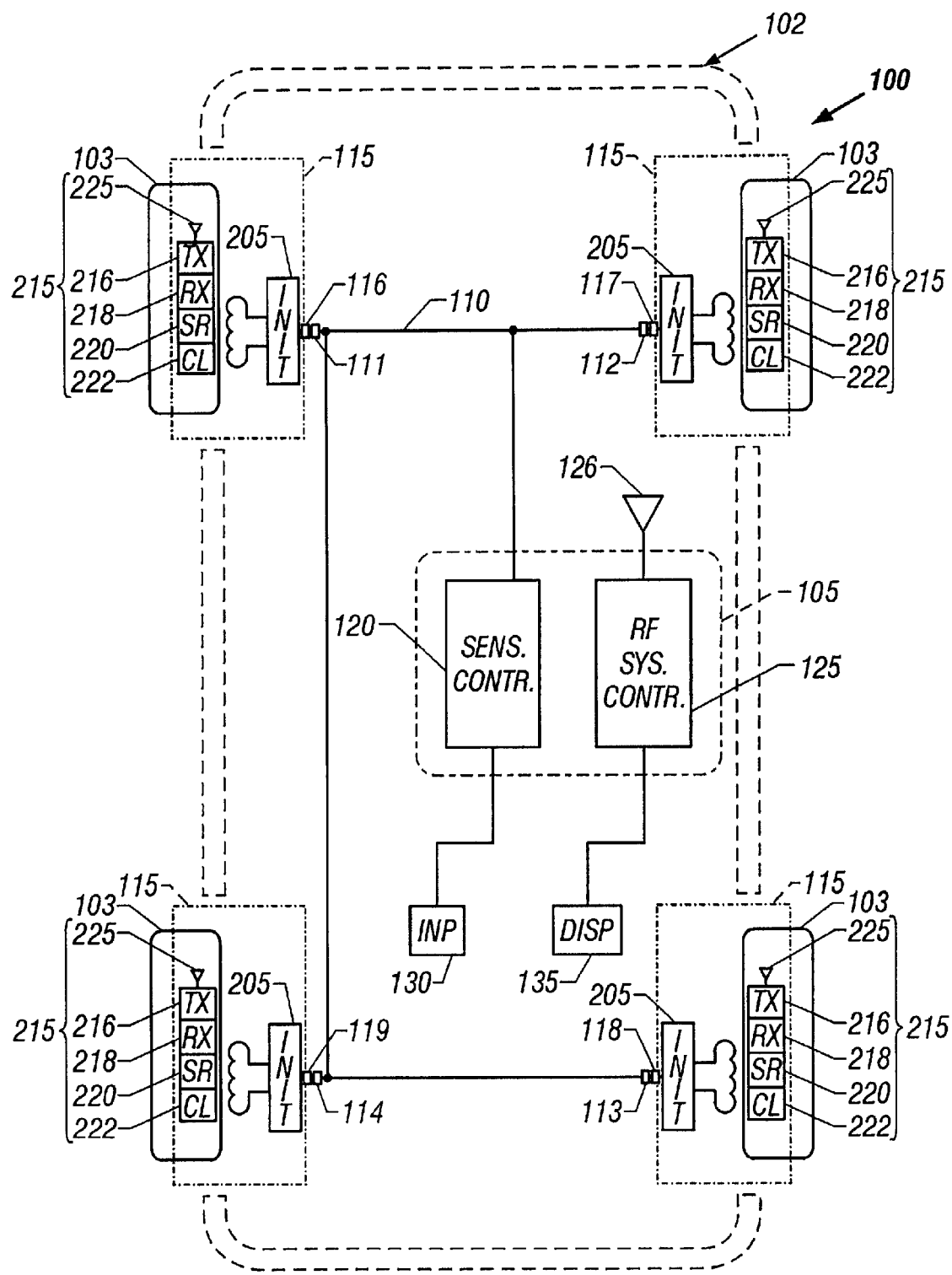
FIG. 2 is a schematic diagram of an exemplary addressable monitoring system embodying the invention.

FIG. 2 shows a schematic diagram of an exemplary addressable monitoring system 100. In the embodiment shown, the system 100 is positioned within a vehicle 102 that has four tires 103. The system 100 includes a controller 105; a harness 110 having four connectors (e.g., plugs) 111, 112, 113, and 114; and a plurality of sensors 115, each having a connector (e.g., a jack) 116, 117, 118, and 119.

The controller 105 includes a sensor controller 120 and a radio frequency ("RF") system controller 125. The sensor controller 120 is programmed to generate and send a command signal for a measurement transmission from each sensor 115 at a specified time (e.g., time interval, and/or distance interval, and/or starting the vehicle 102, etc.). The sensor controller 120 may also receive manual input (discussed later) to generate a command signal. The RF system controller 125 receives and translates the RF signals transmitted from each sensor 115. An antenna 126 is connected to the RF system controller 125 to receive the RF signals. Each RF signal includes an address portion and an information portion. The information portion includes data based on a measurement from a particular sensor 115.

The sensor controller 120 and RF system controller 125 may be implemented using a variety of known devices such as programmable microprocessors, microcontrollers, programmable logic controllers, and other similar devices. The controllers 120 and 125 may also be realized using other integrated circuits, discrete components, and combinations thereof. In a typical embodiment, the controllers 120 and 125 will include or be associated with memory and appropriate input and output devices, as would be apparent to those of ordinary skill in the art. Also, both the sensor controller 120 and RF system controller 125 may include or be associated with or coupled to other elements (e.g., one or more analog-to-digital converters, one or more drivers, one or more power supplies, etc.) that would be apparent to one skilled in the art to support the sensor controller 120 or RF system controller 125. In most embodiments of the invention, a relatively simple microprocessor such as an 8- or 16-bit processor with a clock speed of less than 20 MHz provides adequate performance.

In another embodiment, the controller 105 may be coupled to one or more input devices (shown collectively by box 130) and one or more output devices (shown collectively by box 135). The one or more input devices 130 provide an interface allowing an operator (e.g., driver, passenger) to manually control the sensor controller 120. Example input devices include knobs, dials, push buttons (including keyboards, keypads, etc.), switches, pedals, touch devices (including touch screens), pointing devices, microphones, and other input devices. The one or more output devices 135 provide an interface between the RF system controller 125 and the vehicle operator or passengers, and allow the RF system controller 125 to provide outputs to the operator or passengers. Example output devices include display lights (e.g., light-emitting diodes (LEDs), incandescent bulbs, discharge lamps, fluorescent bulbs, etc.), display screens (including liquid crystal displays (LCDs), etc.), and sound devices (including speakers, tone generating devices, buzzers, etc.).

For example, one embodiment of the invention includes an input device 130 having a keypad mounted on or in the dashboard of the vehicle 102. The keypad may include a selection button for each tire 103 of the vehicle 102. By manually selecting one of the buttons, an operator or passenger can request a measurement reading from a particular sensor 115. In response, the sensor 115 returns the applicable measurement information and sensor location to the RF system controller 125. One embodiment of the output device 135 is a LCD mounted into the dashboard of the vehicle 102. The LCD generates a text display of the selected tire location and respective measurement reading (e.g., "Left Front Tire: 35 PSI", "Right Front Tire: 33 PSI", etc.). In addition to the LCD, the output device 135 may include an additional audible and/or visual warning device which is activated when a tire pressure measurement reading is too low or too high.

Figures 3, 4:
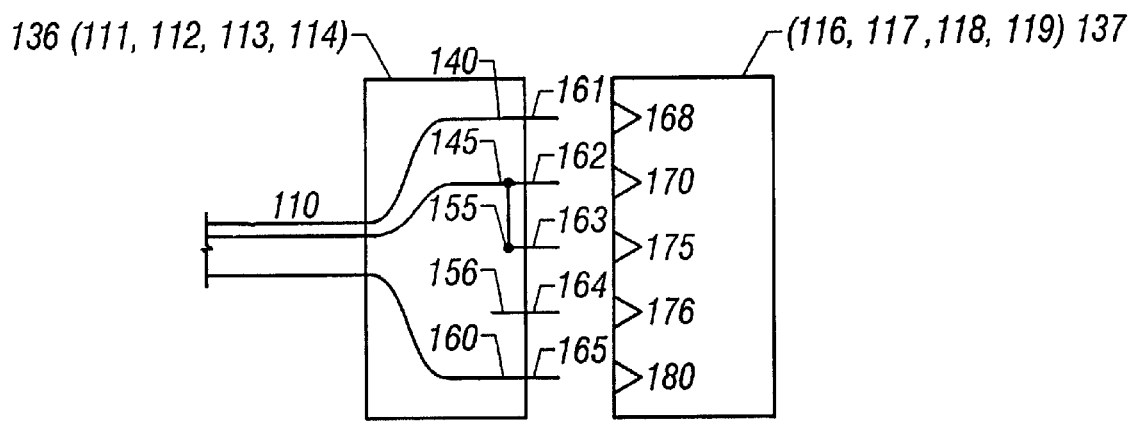
FIG. 3 is a schematic diagram of an exemplary sensor useful in an addressable monitoring system.
FIG. 4 is a table of address combinations for a two address input sensor, such as the one shown in FIG. 3.

The harness 110 connects the sensor controller 120 to each sensor 115 in the system 100. FIG. 3 illustrates an exemplary connector 111–114 (which for purposes of discussion is referred to as plug 136) interfacing with an exemplary connector 116–119 (which for purposes of discussion is referred to as jack 137). In the embodiment shown in FIG. 3, the harness 110 includes a power line 140, a ground line 145, two address lines 155, 156, and a bus line 160. The bus line 160 conveys command signals from the sensor controller 120 to each sensor 115. The plug 136 includes pins 161, 162, and 165 corresponding respectively to each of the lines 140, 145, and 160. The plug 136 also includes pins 163, 164 which may be connected to address lines 155, 156 if the bus 110 is so equipped. In the exemplary embodiment shown in FIG. 3, address line 155 is connected to ground and address line 156 is left floating (i.e., pin 164 is connected to nothing or open). Based upon the type of connection between the plug 136 and the jack 137 (more particularly the relevant values on the pins 163 and 164), each sensor 115 is capable of determining its own address.

As shown in FIG. 3, the jack 137 includes a power input receptacle 168, a ground input receptacle 170, a first address input receptacle 175, a second address receptacle 176, and a bus input receptacle 180. The power line 140, ground line 145, address lines 155, and bus line 160 connect respectively to the power input receptacle 168, the ground input receptacle 170, the address input receptacles 175, and the bus input receptacle 180 of each jack 137. In the embodiment shown, the plug 136 includes two address pins 163, 164 and the jack 137 has two corresponding receptacles 175, 176, but the number of harness-to-sensor address connections can be one or more than two depending upon the monitoring application at hand. For example, a monitoring system 100 with just two sensors 115 may only need a single harness-to-sensor connection. An application with five to eight sensors 115 may require three harness-to-sensor connections.

In the embodiment shown, the address lines 155, 156 are assigned one of two values: a ground value (which may be achieved using a connection to ground) or a floating value (which may be achieved using no or a non-connection). The sensor 115 determines its identity based on the values read by the address receptacles 175, 176. The values read by the address receptacles 175, 176 correspond to the values assigned to the address pins 163, 164. FIG. 4 includes a table that illustrates the unique addresses that may be created using two address pins 163, 164 assigned a floating value (achievable using no connection) or a ground value (achievable using a ground connection). In the table, "A" and "B" are representative of the pins 163 and 164, respectively. As can be seen by reference to the table, each tire 103 is assigned an address or identity. "Tire 1" has an address "GND GND" which in binary terms can be represented as "00." In other words, when pins 163 and 164 in a plug 136 are connected to ground, the jack 137 of a sensor 115 reads the values on the pins 163 and 164 and assigns itself an address of "00." Thereafter, the sensor 115 reads or acknowledges only those command signals that have a "00" address portion and ignores signals with different address portions. "Tire 2", "Tire 3", and "Tire 4" are assigned addresses of "GND N" ("01"), "N GND" ("10"), and "N N" ("11"), respectively. Of course, the correlation of address to tire location can vary front that shown in FIG. 4.

As noted, once a sensor 115 determines its address, the sensor 115 recognizes command signals transmitted over the bus line 110 from the sensor controller 120 addressed to itself and ignores command signals addressed to or intended for other sensors 115. This aspect of the invention enables a monitoring system 100 having a system controller 120 to command each sensor 115 over a common or single bus line, such as the bus line 110. Using a common or single bus line 110 simplifies wiring (especially relative to the sensor controller) and provides savings in materials and space in a vehicle 102 in comparison to prior systems.

In the embodiment shown in FIG. 2, each sensor 115 includes an initiator 205 and a remote module 215. The initiator 205 in each sensor 115 can activate the remote module 215 of the sensor 115. The remote module 215 is located on or in a single tire 103. In the case of a tire pressure monitoring system 100, the remote module 215 includes a transmitter 216, a receiver 218, and a sensor 220. Each remote module 215 may also include a controller 222 programmed to read or take a measurement from the sensor 220 and transmit, via an antenna 225, a RF signal including information based on the reading from the sensor 220 to the RF system controller 125. In an exemplary embodiment of the invention, when information is desired at non-programmed times, manual input from a driver or passenger received through the input device 130 may be used to activate one or more of the initiators 205. Activation of one or more of the initiators 205 causes each associated remote module 215 to transmit a RF signal that includes information representative of a tire pressure sensed by the relevant sensor 218 and an address of the sensor 218 to the RF system controller 125.

Figure 5:
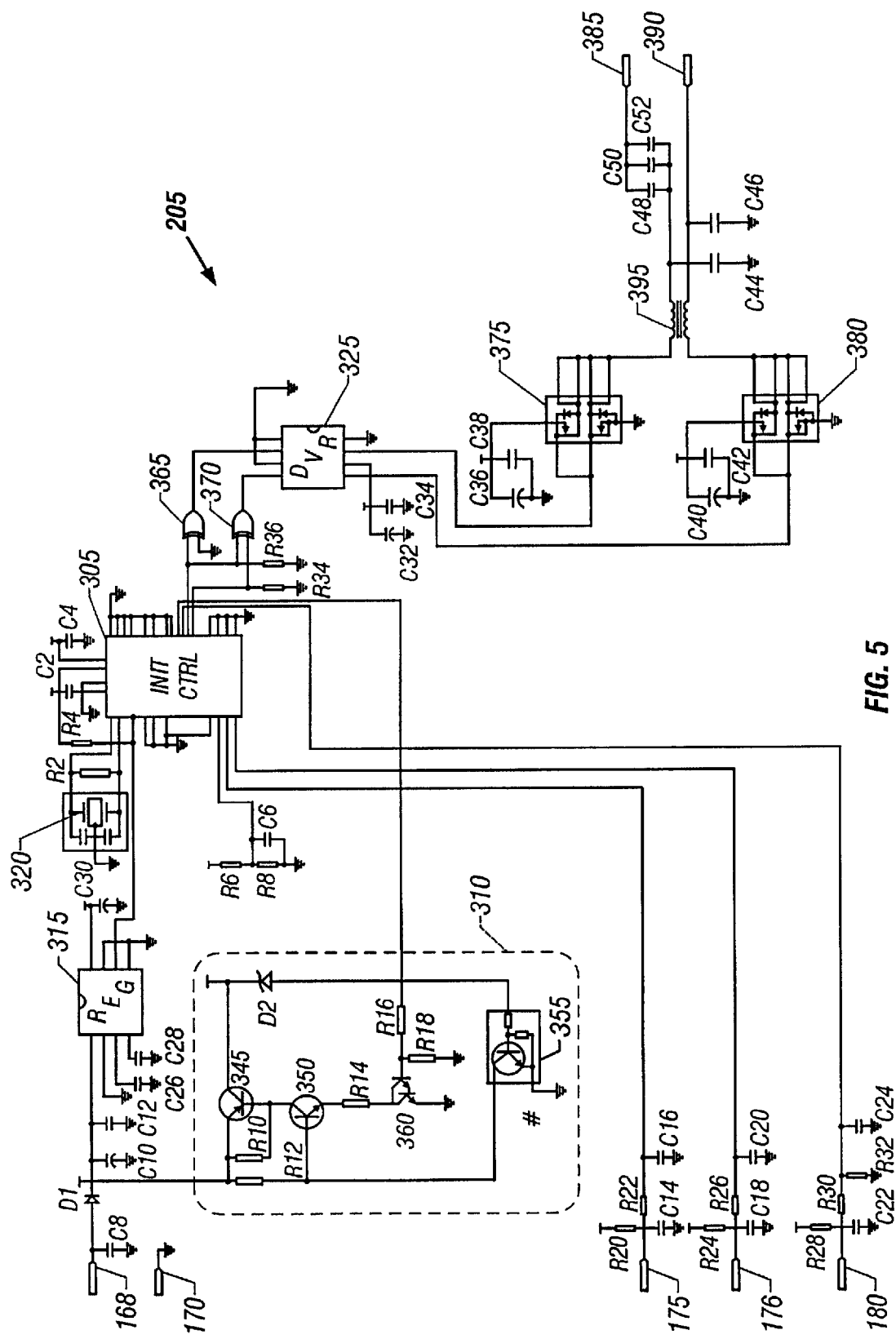
FIG. 5 is a circuit diagram of an exemplary low frequency initiator useful in embodiments of the invention.

FIG. 5 illustrates a circuit diagram of an exemplary low-frequency initiator 205 useful in embodiments of the invention. The initiator 205 generally includes an initiator controller 305, a feedback amplifier 310, a voltage regulator 315, clocking oscillator 320, a MOSFET driver 325, and coil drivers 375/380.

In general, the initiator controller 305 retrieves, interprets and executes the instructions programmed into its memory. The initiator controller 305 is programmed to receive control signals from the controller 120 through the harness 110, to analyze the control signal for data and identification information, and to generate response signals containing control information and/or identification information. For the embodiment shown in FIG. 5, the initiator controller 305 may take the form of a model NEC $\mu$789122 microcontroller. However, a variety of other controllers and processors could be used. Alternatively, the initiator controller 305 could be implemented using a variety of known devices, including microprocessors, programmable logic controllers, and other similar devices. The initiator controller 305 may also be realized using other integrated circuits, discrete components, and combinations thereof. In the example shown in FIG. 5, the initiator controller 305 includes a connection to an assembly of resistors (R2, R4, R6, R8) and capacitors (C2, C4, C6).

Upon connection of the harness 110 to the initiator 205, the power input receptacle 168 provides a connection to the reset of the initiator controller 305. In the exemplary embodiment shown in FIG. 5, the power input receptacle 168 connects with an assembly of capacitors (C8, C10, C12) and a diode (D1) to condition the power signal to the controller 305. The power input receptacle 168 also connects with an over voltage protection circuit 310 to further condition the power signal for the coil driver circuitry 375/380. In the example shown in FIG. 5, the overvoltage protection circuit 310 includes an assembly of resistors (R10, R12, R14, R16, R18); power transistors 345, 350, and 355; a Zener diode (D1); and a Darlington transistor pair 360. Alternatively, other combinations of discrete components and/or amplifier circuits could be used.

Once connected to the harness 110, the initiator controller 305 determines its address. In determining its address, address connectors 155, 156 provide an address signal via the address input receptacles 175, 176 to the initiator controller 305. In the example shown in FIG. 5, an assembly of capacitors (C14, C16, C18, C20) and resistors (R20, R22, R24, R26) conditions the address signal such that it can be read by the initiator controller 305. Alternatively, other combinations of discrete components and/or integrated circuits could be used.

Upon determining its unique address, the initiator controller 305 recognizes which command signals are addressed to itself while ignoring those signals addressed to or intended for other initiators 205. The initiator controller 305 obtains a command signal from the bus input receptacle 180. In the example shown in FIG. 5, the bus input receptacle 180 connects to an assembly of capacitors (C22, C24) and resistors (R28, R30, R32) to condition the command signal such that it can be read by the initiator controller 305. Alternatively, other combinations of discrete components and/or integrated circuits could be used.

The voltage regulator 315 is a voltage-limiting device to protect the circuitry of the initiator controller 305. The voltage regulator 315 receives the power signal from the power input connector 165 and limits the signal before reaching the initiator controller 305. For the embodiment shown in FIG. 5, the voltage regulator 315 may take the form of a model L4949 voltage regulator rated for 5-volts and designed especially for microcomputer control systems in automotive applications. In the example shown in FIG. 5, the voltage regulator 315 includes a connection to an assembly of capacitors (C26, C28, C30).

The clocking oscillator 320 provides a timing signal to the initiator controller 305. The timing signal provides a means to clock and/or count the transmission of the activation signal from the initiator 205 to the remote module 215 at or near the tire 103. In the embodiment shown in FIG. 5, the clocking oscillator 320 may take the form of a quartz generator rated for a frequency of 4 MHz. Of course, a variety of signal generators could be used.

Upon activation by a command signal, the initiator controller 305 uses the timing signal to output logic signals to a pair of exclusive-or gates 365, 370. The exclusive-or gates 365, 370 adjust the modulation of the logic signals before reaching the MOSFET driver 325 (discussed below). In the example shown in FIG. 5, the exclusive-or gates 365, 370 include a connection to resistors (R34, R36).

The MOSFET driver 325 converts the output signals from the exclusive-or gates 365, 370 to modulating voltage signals. In the embodiment shown in FIG. 5, the MOSFET driver 325 may take the form of a Micrel model MIC4427 dual non-inverting MOSFET driver. In the example shown, the MOSFET driver 325 includes a connection to an assembly of capacitors (C32, C34).

The modulating voltage signals from the MOSFET driver 325 direct the switching of a pair of MOSFET transistors 375, 380. The switching MOSFET transistors 375, 380 provide an output of pulsed voltage signals to the antennas 385, 390. In the example shown in FIG. 5, the MOSFET transistors 375, 380 include a connection to an assembly of capacitors (C36, C38, C40, C42).

The pulsed voltage signals from the transistors 375, 380 drives a wireless transmission from the antennas 385, 390 of the initiator 205. The wireless transmission activates the remote module 215 to transmit a pressure reading. In the example shown in FIG. 5, the antennas include a connection to an assembly of a common mode choke coil 395 and capacitors (Cu44, C46, C48, C50, C52) to reduce interference. When the pulsed voltage signals reach the antennas 390, 395, the initiator 205 generates the wireless transmission to the remote module 215 in the proximity of the initiator 205. In the embodiment shown in FIG. 2, the wireless communication is an inductive coupling. Of course, other forms of wireless communication could be used (e.g., RF signal, etc.). With an inductive coupling, the initiator 205 generates a modulating magnetic field. As the initiator 205 and remote module 215 align during the rotation of the tire 103, the magnetic field induces a signal in the receiver 218 of the remote module 215 in the proximity of the initiator 205. Upon the receiver 218 obtaining the induced signal, the control unit 222 activates to transmitter 216 to transmit a RF signal containing identification and air pressure information to the RF system controller 125.

The following is a general description of a cycle of operation for the exemplary embodiment of a tire pressure monitoring system 100 shown in FIG. 2. First, the sensor controller 120 generates and sends a command signal with an address to one or all the sensors 115 in the system 100 to provide an air pressure measurement. Alternatively, an operator may manually initiate a command signal via a remote switch 130 in the dashboard of the vehicle 102. For commands to multiple sensors 115, the sensor controller 120 preferably sends to command signals out to the sensors 115 in close, sequential order. The harness 110 conveys the command signal to all the initiators 205 in the system 100.

Based upon the address connection 155, 156 of to harness 110 to each initiator 205, each initiator 205 recognizes a command signal addressed to itself while ignoring command signals addressed to other initiators 205. If the address of the command signal matches the initiator's address, then the initiator 205 generates a modulating magnetic field in the proximity of the initiator.

When the initiator 205 and remote module 215 align during the rotation of the tire 102, the magnetic field triggers the remote module 215 to transmit a RF signal representing an air pressure value and address of origin to the RF system controller 125, or alternatively, to a separate processor or control unit (not shown). The antenna 126 obtains the RF signal and sends the signal to the RF system controller 125. The processor in the RF system controller 125 translates the address of origin and information signal into a tire 103 location and an air pressure value. Upon matching the origin of the RF signal to a pre-programmed tire 103 location, the RF system controller 125 transmits the tire location and air pressure value to an output device 135.

Thus, the invention provides, among other things, a method and system of addressing a vehicle monitoring system. While the invention has been explained with reference to tire pressure monitoring systems, the invention is not limited to such systems and can be used in other systems monitoring other parameters (temperature, weight, etc.). Various features and advantages of the invention are set forth in the following claims.

What is claimed is:

1. An addressable monitoring system, the system comprising:
   a harness having a common bus line;
   a plurality of sensors, wherein each respective sensor having at least one address input, configured to be connected to the harness, and configured to determine its address based on a physical connection made between the harness and the respective sensor; and
   a controller operable to be connected to the common bus line of the harness and operable to send a control signal through the common bus line to each of the plurality of sensors.

2. A system as claimed in claim 1, wherein the harness further comprises a ground line and a power line.

3. A system as claimed in claim 1, wherein each of the plurality of sensors has at least two address inputs.

4. A system as claimed in claim 1, wherein the harness includes at least one connector, the at least one connector having an address pin.

5. A system as claimed in claim 4, wherein the address pin is connected to a ground connection.

6. A system as claimed in claim 4, wherein the address pin is connected to an open connection.

7. A system as claimed in claim 1, wherein each of the plurality of sensors includes an initiator, the initiator having at least one address input.

8. A method of addressing a plurality of sensors, each sensor having an address input and a bus input, the method comprising:
   providing a harness, the harness having at least two connectors, a common bus line, and at least one address line;
   physically configuring each connector of the harness such that the at least one address line is assigned a value;
   connecting one sensor to each connector such that the address input is coupled to the at least one address line and the bus input is coupled to the common bus line; and
   determining an address for each sensor based on the value of the at least one address line.

9. A method as claimed in claim 8, wherein the method further comprises connecting the harness to a controller.

10. A method as claimed in claim 8, wherein the harness further comprises a ground line and a power line, and the method further comprises coupling the ground line and the power line to each sensor.

11. A method as claimed in claim 8, wherein the harness includes at least one address line, and the method further comprises coupling the at least one address line to each sensor.

12. A method as claimed in claim 8, wherein each of the plurality of sensors includes an initiator and the method further comprises coupling each initiator with a remote module.

13. A method as claimed in claim 12, wherein coupling each initiator with a remote module includes coupling the initiator with the remote module using a low frequency signal.

14. An addressable tire pressure monitoring system for a vehicle, the system comprising:
   a plurality of initiators, each initiator having at least one address input;
   a plurality of tire pressure sensors, each of the plurality of tire pressure sensors operable to be in wireless communication with each of the plurality of initiators;
   a harness having a common bus line and at least one address line and a plurality of connectors, each initiator operable to assign itself an address based upon a connection between the initiator and one of the plurality of connectors; and
   a controller operable to send a signal on the common bus line, the signal having a command information and an address information.

15. A system as claimed in claim 14, wherein the harness includes a power line and a ground line.

16. A system as claimed in claim 14, wherein each of the plurality of initiator has at least two address inputs.

17. A system as claimed in claim 14, wherein each of the plurality of connectors of the harness includes a first address pin and a second address pin, the first address pin connected to a ground connection and the second address pin connected to an open connection.

18. A system as claimed in claim 14, further comprising a plurality of remote modules, one remote module coupled to one initiator.

19. A system as claimed in claim 18, wherein each of the plurality of initiators is operable in a low frequency range.

20. A system as claimed in claim 14, further comprises a display operable to be coupled to the controller, the display operable to present a user interface to a user of the system.

21. A system as claimed in claim 20, wherein the display is sized and configured to be located in a dashboard.

22. A system as claimed in claim 14, wherein each of the plurality of initiators includes:
   a microcontroller;
   a voltage regulator;
   a clocking oscillator;
   a transistor driver; and
   an antenna.

23. A system as claimed in claim 14, wherein each of the sensors includes a transmitter, a receiver, a control unit, and an air pressure sensor, the transmitter operable to send a signal including information representing an air pressure value and an address to the controller.

* * * * *